(No Model.)

J. W. PERTZ.
AUTOMATIC SAFETY REGULATOR VALVE.

No. 330,615. Patented Nov. 17, 1885.

Witnesses:
G. A. Tauberschmidt.
C. R. Pomeroy

Inventor:
John W. Pertz
by F. W. Ritter, Jr.
Atty

UNITED STATES PATENT OFFICE.

JOHN WILHELM PERTZ, OF PITTSBURG, PENNSYLVANIA, ASSIGNOR OF ONE-HALF TO GEORGE E. WILLIAMS, OF SAME PLACE.

AUTOMATIC SAFETY REGULATOR-VALVE.

SPECIFICATION forming part of Letters Patent No. 330,615, dated November 17, 1885.

Application filed February 6, 1885. Serial No. 155,141. (No model.)

*To all whom it may concern:*

Be it known that I, JOHN W. PERTZ, a citizen of the United States, residing at Pittsburg, in the county of Allegheny and State of Pennsylvania, have invented certain new and useful Improvements in Automatic Safety Regulator-Valves; and I hereby declare the following to be a full, clear, and exact description of the same, reference being had to the accompanying drawings, in which—

Figure 1:
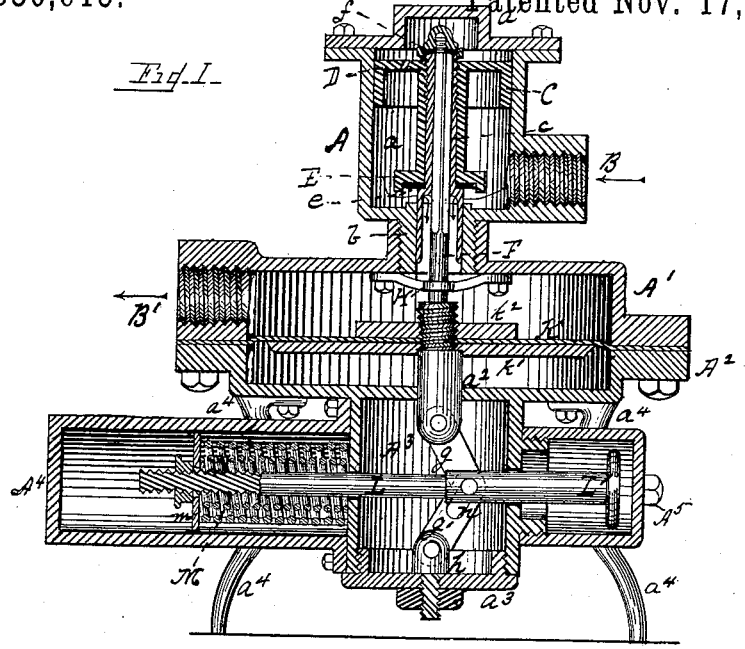
Figure 2:
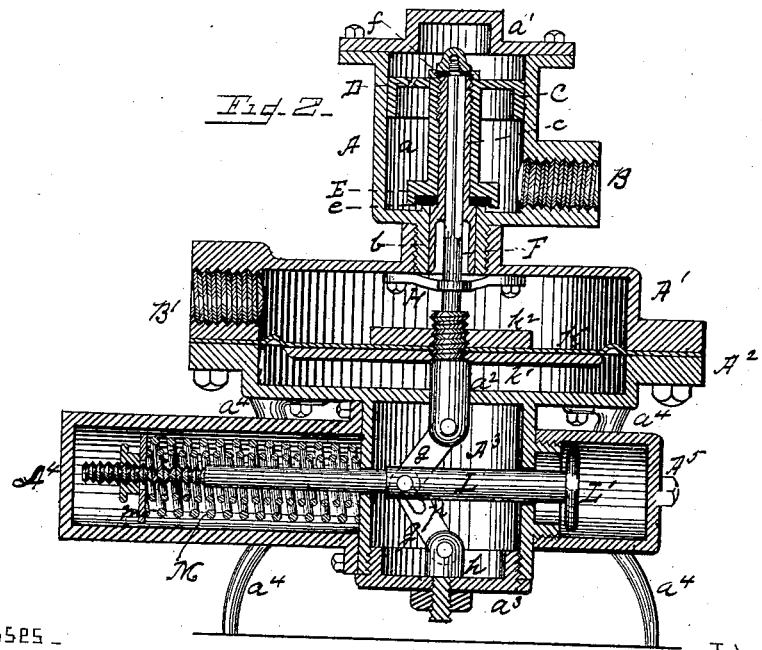

Figure 1 is a central vertical section of a regulator embodying my invention, set to allow the passage of the gas or fluid and regulate the pressure thereof. Fig. 2 is a similar section showing the position the devices assume automatically, so as to set the valve and cut off the passage of the gas or fluid if the flow of the same becomes intermittent or ceases temporarily.

Like letters refer to like parts wherever they occur.

My invention relates to the construction of devices for regulating and controlling the flow and pressure of gases or fluids; and has for its object, first, to maintain uniform pressure in the delivery-pipe notwithstanding any increase or decrease in the pressure in the service-pipe; and, secondly, to cut off the flow entirely should the same become intermittent or cease. It is well understood that the pressure in gas, steam, and water-service pipes will vary from time to time, and this in the case of fluids is manifested by the irregularity of any machinery operated thereby, and in the case of gas by the pulsation and irregularity of the flame. Moreover, if the flow of gas or fluid ceases or becomes intermittent, (especially in the case of gas,) and the cocks or valves of the delivery-pipes are not closed, subsequent renewal of the flow may lead to dangerous results. This is markedly the case where gas is used for heating and illumination—as, for instance, natural gas, which is now coming into extensive use. Parties using natural gas in dwellings are limited by the gas company to a certain predetermined pressure, and the regulators are set to operate at and maintain such pressure. If, as frequently happens, (from the action of the wells or other causes,) the flow in the main pipe should become intermittent or cease temporarily, the fires or lights in the dwelling will go out. Should the flow in the main begin again before the cocks at the burners have been closed, the dwelling will become filled with a gas dangerous to life, or with a mixture of gas and air of a highly-explosive character. To provide means which shall act automatically to prevent such dangers is the leading feature of this invention, while the minor features relate to details of construction equally applicable to fluid-regulators in general.

The general features of construction are those of pressure-regulators wherein two plungers or pistons, two flexible diaphragms, or a piston and a diaphragm of unequal area, are connected, that having the lesser area supplemented by a counterbalance spring or weight, which is set to the required pressure.

The special or characteristic feature of the automatic cut-off is so combining the counterbalance spring or weight with the diaphragms or pistons that when the apparatus is set for the flow of the gas the counter-balance will supplement the piston or diaphragm having the least area; but when the flow or pressure of the gas or fluid shall intermit or cease the force of the counter-balance will be shifted so as to act with the piston or diaphragm having the greatest area, and thus keep the valves closed. For obtaining this result I have found a spring and toggle-joint, arranged as hereinafter more fully set forth, to give good results as a shifting counter-balance.

I will now proceed to describe my invention more specifically, so that others may apply the same.

In the drawings, A indicates the shell, having the bore or cylinder $a$ for the smaller piston or (diaphragm,) the induction-port B, leading from the main or service pipe, and the hollow stem $b$, leading to the shell of the larger (piston or) diaphragm chamber. This cylinder may be closed by a cap, $a'$.

A' indicates one section of the body or shell for the larger (piston or) diaphragm provided with the eduction-port B', and $A^2$ indicates the other (or lower) section. Between these sections the flexible diaphragm (when a diaphragm is used) may be clamped, the sections A' $A^2$ being held by suitable bolts. The lower section, $A^2$, has a central port or opening, $a^2$, for the passage of the valve-stem, a box, $A^3$, for the toggle hereinafter described, said box being closed by a detachable cover or cap, $a^3$, and, if desired, legs or supports $a^4$. On or attached to one side of the toggle-box $A^3$ is the spring casing or box $A^4$, and on the opposite the knob-box $A^5$, which latter should be readily detachable or provided with a detachable cap, so as to give easy access to the knob. Within a shell of the general character specified is arranged the automatic mechanism of the regulator, consisting in the present instance of a piston, C, and diaphragm K, connected by a valve-stem, F, and the shifting counter-balance composed of a spring-rod, L, connected to the stem by a toggle and a counterbalance-spring, M. The piston C, which fits snugly within the cylinder $a$, has a small port, D, therethrough to balance the piston, terminates below in a valve, E, adapted to close the port $b$, which leads to shell $A^2$, said valve provided, if desired, with a packing, $e$. The piston C and valve E are preferably formed in one piece, and are screwed on or otherwise secured to the central stem-guide, $c$.

F indicates the valve-stem which is fluted for part of its length, passes loosely through the piston C or central stem-guide, $c$, and terminates above in the button-valve $f$. This construction of the valve-stem F, it will be observed, establishes communication through the hollow central stem-guide, $c$, from above piston C to above diaphragm K, enables the stem F and piston C to have movement each independent of the other, and enables the communication through piston C to be closed by the button-valve $f$.

K indicates a flexible diaphragm arranged in the chamber formed by the shell-sections $A'$ $A^2$, and held by having its edges clamped by the said sections. It is provided with a shield, $k'$, and a nut, $k^2$, by means of which it is secured to the stem F, which stem passes through the diaphragm K, and through the shell $A^2$, into the toggle case or box $A^3$. The area of this diaphragm exceeds the area of the face of piston C, as before specified.

H indicates a guide for the stem F. L indicates a spring-rod, which extends transversely through the toggle-box $A^3$, being provided at one end (within the knob-box $A^5$) with a knob, L', and encompassed at the other (within the spring case or box $A^4$) by one or more springs, M, and having a washer, $m$, and a nut or other means by which the tension of the springs may be exerted on the rod. I prefer a nest of spiral springs, as shown in the drawings; but the same result may be obtained by any form of spring, by a pulley and weight, a counterweighted lever, or any one of the manifold well-known equivalent ways of producing the same result without departing from the spirit of my invention. This spring-rod L is connected with the end of valve-stem F by a link or lever, $g$, pivoted on the rod L, and also on the end of the stem F, and also to the case by a tie or guide link, $g'$, pivoted on the rod L, and on a peg, $h$, secured to the toggle-box $A^3$ or its detachable cap. The links $g g'$ constitute the toggle form of joint; but the link $g$ is the only essential member of the joint, as the rod L cannot move out of its path, being held and guided by the casing, so that the member $g'$ is simply a brace and bearing to prevent the spring of the rod within the case, which might be dispensed with, and which, if used, should be slotted, as at $n$, or provided with a spring-seat—as, for instance, a coiled spring inclosing the threaded stem of peg $h$—to permit the links $g g'$ to pass the center. This construction being of the general character herein before specified will operate as follows: The flow from the main being admitted to cylinder $a$ through induction-pipe B, the cap $A^5$ is removed and the rod L drawn out by means of knob L', until the toggle $g g'$ occupies the position shown in Fig. 1, and the springs have been compressed so as to exert the proper pressure on stem F. This can be readily done, as the stem F passes loosely through the piston C. The pressure of the gas entering through port B lifts the piston C and passes beneath valve E, through port $b$, exerts its force on diaphragm K, and passes thence by port B' to the delivery-pipe for use. The pressure on piston C is also equalized by means of the by-path formed by the fluted valve-stem F and the port D in the piston C. The springs M having been compressed to exert the proper force on the stem F, the casing $A^5$ may be replaced, and the further operation of the regulator during the flow of the gas or fluid will be the same as other regulators, and need not be further specified. It will be noted that as set for operation, as in Fig 1, the force exerted on the stem is in reverse direction or counterbalances the pressure on the diaphragm K, (or larger piston,) as in the most approved constructions of regulators. If, however, the flow of gas or fluid in the main or service pipe becomes intermittent or ceases temporarily, the pressure on diaphragm K will cease. Then, as there is nothing to counteract the force of springs M, the rod L will be drawn into spring-casing $A^4$, which will bring the links $g g'$ (or toggle) into the position shown in Fig. 2 of the drawings, or, in other words, shift the counter-balance, which can occur the more readily as the stem F moves through piston C. The force of the spring M, it will be observed, is now exerted to draw the button-valve $f$ down on its seat and the valve E down on its seat, so that should the gas or fluid again resume its flow in the main it will find the regulator closed against its passage, as the pressure of the gas or fluid upon the face of piston C will be counteracted by the spring (which may be powerful enough in itself) plus the pressure on the top of valve E, when valve E is formed with an expanded top, as shown. The regulator will thus remain closed against the passage of gas or fluid until the casing or cap A⁵ is removed and the regulator is reset, as shown in Fig. 1, by drawing on the rod L.

It is evident that the nature, operation, and object or result of my invention having been herein fully described, persons skilled in the art to which it appertains can, from the present known state of the art, substitute pistons in part or in whole for diaphragms, weights for springs, a rack and segment or pinion for the toggle-links, and other equivalents for elements and combinations herein shown and described, and this without departing from the spirit of my invention, and without the further exercise of the inventive faculty, and I wish to be understood herein as extending the scope of my invention and claims to include all equivalents producing the same result. It is also evident that the safety mechanism or shifting counter-balance, composed of the stem, spring-rod, toggle and springs or their equivalents, forms a safety attachment applicable to many other forms of regulators. Therefore I include such features independently employed as within the scope of the present invention.

Having thus set forth the nature, operation, and advantages of my invention, what I claim, and desire to secure by Letters Patent, is—

1. In a safety pressure-regulator, the combination, with the diaphragms or pistons, of a counter-balance so arranged with relation thereto that when the apparatus is set for the flow of gas or fluid the counter-balance will supplement the piston or diaphragm having the least area, but when the flow or pressure of the fluid intermits or ceases the force of the counter-balance will be shifted so as to act with the piston or diaphragm having the greatest area, substantially as and for the purposes specified.

2. In an automatic or safety pressure-regulator, the combination, with the stem of the pistons or diaphragms, of a spring, spring-rod, and toggle-connection between the stem and spring-rod, substantially as and for the purposes specified.

3. In a pressure-regulator, the combination of two diaphragms or pistons, the lesser having a port around or through the same, and a fluted valve-stem movable through the lesser piston or diaphragm, and provided with a button-valve, substantially as and for the purposes specified.

4. In a regulator, the combination of a diaphragm or piston, a piston of lesser area having a port therethrough, and a valve which controls the port between the two piston-chambers, and a valve-stem movable through the small piston and provided with a button-valve, substantially as and for the purposes specified.

5. In a pressure-regulator, the combination of the diaphragm K, the piston C, having the port D and valve E, the fluted valve-stem F, having button-valve $f$, and a shifting counter-balance, substantially as and for the purposes specified.

6. In a pressure-regulator, the combination of the diaphragm K, the piston C, having port D and valve E, the fluted stem F, provided with the button-valve $f$, and the shifting counter-balance composed of the springs M, spring-rod L, and link $g$, substantially as and for the purposes specified.

In testimony whereof I affix my signature, in presence of two witnesses, this 31st day of January, 1885.

JOHN WILHELM PERTZ.

Witnesses:
WM. MARTIN,
NICHOLAS P. WIFFLER.